(12) United States Patent
Bhavaraju et al.

(10) Patent No.: US 11,486,046 B2
(45) Date of Patent: Nov. 1, 2022

(54) PRODUCTION OF SODIUM METAL BY DUAL TEMPERATURE ELECTROLYSIS PROCESSES

(71) Applicant: Enlighten Innovations Inc., Calgary (CA)

(72) Inventors: Sai Venkata Bhavaraju, Calgary (CA); Roger Marc Flinders, Calgary (CA); Thomas Ray Hinklin, Calgary (CA); Steven William Hughes, Calgary (CA); Mykola Makowsky, Calgary (CA); Mathew Richard Robins, Broomfield, CO (US)

(73) Assignee: Enlighten Innovations Inc., Calgary (CA)

(*) Notice: Subject to any disclaimer, the term of this patent is extended or adjusted under 35 U.S.C. 154(b) by 0 days.

(21) Appl. No.: 17/192,799

(22) Filed: Mar. 4, 2021

(65) Prior Publication Data
US 2021/0277529 A1     Sep. 9, 2021

Related U.S. Application Data

(60) Provisional application No. 62/985,287, filed on Mar. 4, 2020.

(51) Int. Cl.
| | | |
|---|---|---|
| C25C 3/00 | (2006.01) | |
| C25C 1/02 | (2006.01) | |
| C25C 7/04 | (2006.01) | |

(52) U.S. Cl.
CPC . C25C 1/02 (2013.01); C25C 7/04 (2013.01)

(58) Field of Classification Search
CPC .... C25C 1/00; C25C 7/02; C25C 3/00; C25C 7/00; C25C 1/02; C25C 5/02; C25C 3/02; C25C 5/04; C25C 7/04; C25C 3/18; C25C 7/005; C25C 3/08; C25C 3/16
See application file for complete search history.

(56) References Cited

U.S. PATENT DOCUMENTS

| | | | |
|---|---|---|---|
| 4,018,969 A | | 4/1977 | Fischer et al. |
| 4,699,704 A | * | 10/1987 | Ishizuka ............... C25C 7/005 204/247 |
| 6,030,720 A | | 2/2000 | Chu |
| 9,413,036 B2 | | 8/2016 | Bhavaraju et al. |
| 9,431,656 B2 | | 8/2016 | Bhavaraju |
| 9,493,882 B2 | | 11/2016 | Bhavaraju et al. |

(Continued)

FOREIGN PATENT DOCUMENTS

| | | |
|---|---|---|
| CN | 105742727 B | 5/2018 |
| EP | 3 397 371 A1 | 11/2018 |

(Continued)

OTHER PUBLICATIONS

International Search Report and Written Opinion in PCT/US2021/020945 dated Jun. 18, 2021 (18 pages).

(Continued)

*Primary Examiner* — Zulmariam Mendez
(74) *Attorney, Agent, or Firm* — Foley & Lardner LLP

(57) ABSTRACT

New dual temperature electrochemical methods and systems for the production of sodium metal from sodium polysulfides have been discovered. The technology provides high conductivity for sodium ions and extended service life for the electrochemical cell.

23 Claims, 14 Drawing Sheets

(56) References Cited

U.S. PATENT DOCUMENTS

| | | |
|---|---|---|
| 9,957,622 B2 | 5/2018 | Mosby et al. |
| 10,145,019 B2 | 12/2018 | Bhavaraju et al. |
| 10,854,929 B2 | 12/2020 | Bhavaraju et al. |
| 10,968,525 B2 | 4/2021 | Mosby et al. |
| 2011/0014505 A1 | 1/2011 | Bradwell et al. |
| 2012/0141856 A1 | 6/2012 | Gordon et al. |
| 2014/0027300 A1* | 1/2014 | Huber .................. C25C 7/005 205/345 |
| 2014/0197040 A1 | 7/2014 | Gordon et al. |
| 2014/0356654 A1 | 12/2014 | Bhavaraju |
| 2015/0030896 A1 | 1/2015 | Bhavaraju et al. |
| 2016/0049658 A1 | 2/2016 | Chae et al. |
| 2018/0034048 A1* | 2/2018 | Teran ..................... C08L 9/00 |
| 2018/0363153 A9 | 12/2018 | Gordon |

FOREIGN PATENT DOCUMENTS

| | | |
|---|---|---|
| WO | WO-2010/135283 A2 | 11/2010 |
| WO | WO-2014/152393 A1 | 9/2014 |
| WO | WO-2017/117373 | 7/2017 |

OTHER PUBLICATIONS

International Search Report and Written Opinion in PCT PCT/US2021/020942 dated Jun. 11, 2021 (12 pages).

Lu et al., Advanced intermediate-temperature Na—S battery, Energy Environ. Sci., 2013, 6, 299-306, DOI: 10.1039/c2ee23606k (Year: 2013).

Yu et al., "A class of liquid anode for rechargeable batteries with ultralong cycle life", Nature Communications, 8, 2017, 14629, DOI: 10.1038/ncomms14629 (Year: 2017).

\* cited by examiner

PRODUCTION OF SODIUM METAL BY DUAL TEMPERATURE ELECTROLYSIS PROCESSES

CROSS REFERENCE TO RELATED APPLICATIONS

This application claims priority to U.S. Provisional Application No. 62/985,287, filed Mar. 4, 2020, which is incorporated by reference in its entirety.

BACKGROUND

Liquid hydrocarbons, including many oil feedstocks, often contain difficult to remove sulfur in the form of organosulfur compounds as well as metals and other heteroatom-containing compounds that hinder usage of the hydrocarbons. Sulfur can cause air pollution and can poison catalysts used in petroleum processing or catalysts designed to remove hydrocarbons and nitrogen oxide from motor vehicle exhaust. There has been a worldwide trend to limit the amount of sulfur in hydrocarbon fuels, such as gasoline, diesel, and fuel oils, including marine bunker fuels. Metals contained in the hydrocarbon stream can also poison the hydroprocessing catalysts typically utilized for removal of sulfur whereby hydrogen reacts under extreme conditions to break down the sulfur bearing organosulfur molecules.

Sodium metal has been recognized as potentially effective for the treatment of high-sulfur hydrocarbons, including petroleum oil distillate, crude, heavy oil, bitumen, and shale oil. Sodium is capable of reacting with the oil and its contaminants to dramatically reduce the sulfur, nitrogen, oxygen, and metal content of the oil through the formation of sodium sulfide compounds (sulfide, polysulfide and hydrosulfide) as well as other sodium-containing byproducts. To make such desulfurization techniques economically viable, the sodium metal must be regenerated from the sodium sulfides/polysulfides and other sodium-containing byproducts. Although metallic sodium may be electrochemically regenerated from such sulfides/polysulfides and by-products, short service life of the electrochemical cells used in these methods has stymied their commercial use. Thus, cost-effective and robust electrochemical systems and methods for producing sodium metal from sulfides/polysulfides have not been available, until now.

SUMMARY

New electrochemical methods for the production of sodium metal from sodium polysulfides have been discovered. The technology provides high conductivity for sodium ions and extended service life for the electrochemical cell. The inventors developed the present technology after their extensive investigations revealed that a sodium polysulfide/diol anolyte was chemically unstable under the electrolytic conditions for producing sodium metal from the sodium polysulfide salts. Surprisingly, the side-reactions that caused anolyte deterioration were found to exhibit an extreme and heretofore unrecognized temperature dependence. The present technology provides a new dual temperature electrolytic methods with high throughput and long service life for the electrochemical cell.

In one aspect the technology provides methods of preparing sodium metal from sodium salts, e.g., sodium sulfide/polysulfide or sodium halide/polyhalide. The methods include introducing an anolyte at a first temperature into an anolyte compartment of an electrochemical flow cell (or hybrid flow cell). The anolyte includes an effective amount of a sodium salt (e.g., a sulfur-containing sodium salt) dissolved in a temperature-sensitive solvent. The anolyte compartment includes an anode comprising the sodium salt. The electrochemical flow cell further includes a catholyte compartment and a ceramic sodium ion conductive membrane that separates the anolyte compartment from the catholyte compartment. The catholyte compartment includes a molten sodium cathode. The method further includes causing sodium ions from the sodium salt to pass through the ceramic sodium ion conductive membrane from the anolyte compartment to the catholyte compartment; reducing the sodium ions to sodium metal at the molten sodium cathode; and cooling the anolyte outside the anolyte compartment to a second temperature. In any embodiments, the ceramic sodium ion conductive membrane may have a conductivity of at least 10 mS cm$^{-1}$ or at least 50 mS cm$^{-1}$ when anolyte is in the anolyte compartment (i.e., at the cell operating temperature). The second temperature causes degradation of the temperature-sensitive solvent at a rate less than 20% of the rate that occurs at the first temperature. Thus, by only heating a fraction of the anolyte for a short period of time, as it enters the electrochemical cell and quickly cooling it as it leaves the cell, anolyte side reactions are minimized and cell life greatly extended.

In any embodiments, the methods further include oxidizing the anion(s) of the sodium salt at the anode. In any embodiments, sodium salt includes a sodium sulfide, a sodium polysulfide, a mixture of sodium sulfide and one or more sodium polysulfides. In some such embodiments the methods further include oxidizing the sulfide and/or polysulfides at the anode to higher polysulfides and/or sulfur. In any embodiments of the present methods, the anolyte includes sulfur, which may optionally be recovered from the anolyte. In any embodiments, at least a portion of the sodium metal formed in the catholyte compartment may be removed and/or recovered.

In another aspect, the present technology provides a system for carrying out the present methods. Thus, a system is provided for the production of sodium metal by dual temperature electrolysis that includes: an anolyte source comprising anolyte; at least one pump for pumping anolyte within the system; a heater for heating anolyte to a first temperature; a chiller for cooling anolyte to a second temperature, lower than the first temperature; and an electrolytic flow cell. The electrolytic flow cell includes an anolyte compartment and a catholyte compartment separated by a sodium ion conductive ceramic membrane; an anode comprising a sodium salt, disposed in the anolyte compartment; a molten sodium cathode disposed in the catholyte compartment; and a power supply electrically connected to the anode and cathode. In the electrolytic flow cell the anolyte compartment further comprises an anolyte inlet and an anolyte outlet; and the catholyte compartment comprises an opening through which molten sodium may flow. The anolyte source is in fluid connection with the pump and the anolyte inlet of the anolyte compartment; the heater is adapted to heat the anolyte from the anolyte source before or upon entering the anolyte compartment; and the chiller is adapted to cool the anolyte upon exiting the anolyte compartment. It will be appreciated that the system may optionally employ any of the elements described herein including but not limited to the anolyte, anode, catholyte, cathode, current collectors, and other equipment, e.g., in FIG. 8 and accompanying text, including equipment for sulfur and/or sodium metal recovery.

DETAILED DESCRIPTION

Figure 1A:
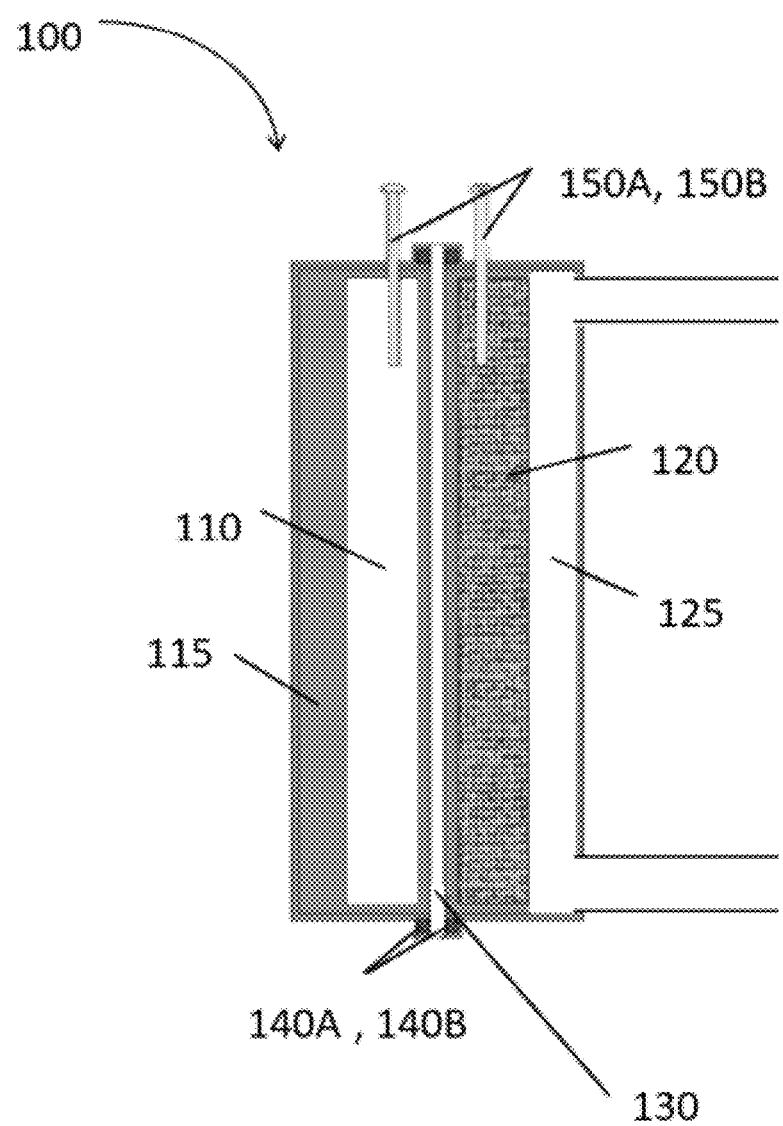
FIGS. 1A and 1B are schematic depictions of illustrative embodiments of electrochemical cells that may be used in the present methods and systems.

The following terms are used throughout as defined below.

As used herein and in the appended claims, singular articles such as "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

"Ceramic sodium ion conductive ceramic membrane" refers to any suitable ceramic membrane that prevents molten sodium cathode from contacting the anode and anolyte, but which allows sodium ions to be selectively transported from the anode/anolyte, through the membrane, to the cathode.

"Alkyl diol" or "alkane diol" refer to alkanes of 2-6 carbons (i.e., 2, 3, 4, 5, or 6 carbon atoms) or alkylene ethers of 4-8 carbons (i.e., 4, 5, 6, 7, or 8 carbon atoms) having two hydroxyl groups attached to different carbons. It will be understood that alkanes are saturated linear or branched hydrocarbons. Similarly, "alkyl triol" or "alkane triol" refer to alkanes of 3-6 carbons (i.e., 2, 3, 4, 5, or 6 carbon atoms) or alkylene ethers of 4-8 carbons (i.e., 4, 5, 6, 7, or 8 carbon atoms) having three hydroxyl groups attached to three different carbons. Examples of alkane diols and triols include but are not limited to ethylene glycol (i.e., ethane-1,2-diol), propylene diol (e.g., propane-1,2-diol, propane-1,3-diol), glycerol, butane diol (e.g., butane-1,2-diol, butane-1,3-diol, butane-2,3-diol, butane-1,4-diol, 2-methylpropane-1,3-diol, and the like), butane triol (e.g., butane-1,2,3-triol, butane-1,2,4-triol, 2-hydroxymethylpropane-1,3-diol, and the like), pentane diol e.g., pentane-1,2-diol, pentane-1,3-diol, pentane-2,3-diol, pentane-1,4-diol, pentane-1,5-diol, 2-methylbutane-1,4-diol, and the like), pentane triol (e.g., pentane-1,2,5-triol, pentane-1,3,5-triol, 2-hydroxymethylbutane-1,4 diol, and the like), hexane diol (e.g., hexane-1,2-diol, hexane-1,6-diol, hexane-1,3-diol, hexane-2,3-diol, hexane-3,4-diol and the like), hexane triol (e.g., hexane-1,2,3-triol, hexane-1,2,-triol, hexane-1,3,6-triol, and the like). Examples of alkylene diols and triols.

"Cycloalkyl diol" or "cycloalkane diol" refer to cycloalkanes of 3, 4, 5, or 6 carbons having two hydroxyl groups attached to different carbons. "Cycloalkyl triol" or "cycloalkane triol" refer to cycloalkanes of 3, 4, 5, or 6 carbons having three hydroxyl groups attached to different carbons. Examples include cyclopropane-1,2-diol, cyclobutane-1,3-diol, cyclopentanes-1,2-diol, cyclohexane-1,2-diol, cyclohexane-1,3-diol, cyclohexane-1,4-diol, and the like).

"Temperature-sensitive solvent" as used herein, refers to a solvent utilized in an electrolyte of an electrochemical cell for dissolving or partially dissolving one or more species (e.g., salts or neutral, uncharged compounds), and which, as temperature increases, is increasingly unstable, subject to decomposition, and/or other side-reactions that adversely impact the performance of the electrolyte.

High sodium ion conductivity is desirable to ensure high throughput in the electrolytic production of sodium metal from a sodium salt such as a sodium polysulfide. To achieve the desired conductivity for a particular combination of sodium sulfide and polysulfide salts a balance must be struck between the anolyte, anode and ceramic ion-conductive membrane selected are part of the electrochemical cell. The inventors have found that low molecular weight diols and triols (having, e.g., a molecular weight of less than 400 Da, such as from about 62 Da to less than about 200 Da) provide good solubility for sodium sulfide/polysulfides and lower solubility of elemental sulfur, while maintaining maximal sodium ion conductivity of the cell. However, the performance of such cells has been found to deteriorate over the course of a few days, making them unsuitable for extended commercial use.

At least the following side reactions of the sodium polysulfide ($Na_2S_x$) and/or diols/triols such as ethylene glycol (EG) have been identified:
1. Generation of hydrogen sulfide gas due to EG acting as an acid and $Na_2S_x$ acting as a base.
2. Formation of sodium sulfur oxygenates (such as sodium thiosulfate, sodium sulfate, etc.) by extraction of oxygen from the glycol by $Na_2S_x$.
3. Extraction of methylene groups from EG by S from $Na_2S_x$ to form vulcanized or inverse vulcanized oligomers of sulfur and methylene groups.
4. Formation of sodium carboxylates (such as sodium acetate, sodium glycolate, sodium formate, sodium oxalate etc.) due to electrochemical oxidation of EG in alkaline medium.
5. Formation of gases such as dimethyl disulfide, carbon disulfide, carbon dioxide etc.

Observations 1, 2, and 3 are consistent with the following side reactions, shown below

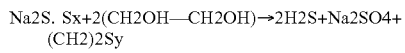

Observations 4, and 5 are consistent with the following side reaction, shown below:

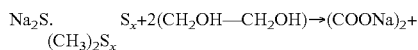

Thus, it was surprisingly discovered that the use of ethylene glycol resulted in an undesirable increase in the electrolysis cell's Area Specific Resistance (ASR), causing the current to drop in a matter of few days.

Thermal degradation and electrolysis tests as a function of anolyte temperature have shown a drastic degradation reaction rate decrease and the equilibrium shift to the left (favoring the reactants in the above degradation reactions) as the process temperature is reduced from greater than 125° C. to a lower temperature. In fact, the degradation rate was dramatically reduced when the anolyte temperature is not more than 110° C., and particularly when the anolyte temperature is not more than 100° C. See, e.g., FIGS. 3-7, each of which show electrolyte degradation at the high end of this spectrum, i.e., at the temperatures preferred for excellent conductivity and current density.

The above reactions became pronounced at temperatures above 120° C., especially above 125° C. Given that such temperatures are nevertheless desirable for providing high sodium ion conductivity of the membrane during electrolysis, the present technology provides methods and systems that minimize anolyte degradation at operational temperatures of, e.g., 125° C. to 150° C., while maintaining high sodium ion conductivity.

Thus, in one aspect, the present technology provides a method including:
introducing an anolyte at a first temperature into an anolyte compartment of an electrochemical flow cell, wherein
the anolyte comprises an effective amount of a sodium salt dissolved in a temperature-sensitive solvent;
the anolyte compartment comprises an anode comprising the sodium salt;
the electrochemical flow cell further comprises a catholyte compartment and a ceramic sodium ion conductive membrane that separates the anolyte compartment from the catholyte compartment; and
the catholyte compartment comprises a molten sodium cathode;
causing sodium ions from the sodium salt to pass through the ceramic sodium ion conductive membrane from the anolyte compartment to the catholyte compartment;
reducing the sodium ions to sodium metal at the molten sodium cathode; and cooling the anolyte outside the anolyte compartment to a second temperature;
wherein the second temperature causes degradation of the temperature-sensitive solvent at a rate less than 20% of the rate that occurs at the first temperature.

In another aspect, the present technology provides a method comprising:
introducing an anolyte at a second temperature into an anolyte compartment of an electrochemical flow cell, wherein
the anolyte comprises an effective amount of a sodium salt dissolved in a temperature-sensitive solvent;
the anolyte compartment comprises an anode comprising the sodium salt;
the electrochemical flow cell further comprises a catholyte compartment and a ceramic sodium ion conductive membrane that separates the anolyte compartment from the catholyte compartment; and
the catholyte compartment comprises a molten sodium cathode;
causing sodium ions from the sodium salt to pass through the ceramic sodium ion conductive membrane from the anolyte compartment to the catholyte compartment; and
reducing the sodium ions to sodium metal at the molten sodium cathode;
wherein the second temperature causes degradation of the temperature-sensitive solvent at a rate less than 20% of the rate that would occur at the first temperature.

In any embodiments, the sodium salt may include a sodium sulfide, a sodium polysulfide, a mixture of sodium sulfide and one or more sodium polysulfides, a sodium halide, a sodium polyhalide, or a mixture of sodium halide and one or more sodium polyhalides. In any embodiments, the sodium salt may include a sodium sulfide, a sodium polysulfide, a mixture of sodium sulfide and one or more sodium polysulfides. In any embodiments, the polysulfide may have the formula $Na_2S_x$ wherein x is an integer from 1 to 32, i.e., 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, or a range between and including any two of the foregoing values (e.g., 1 to 7 or 1 to 5). However, it will be understood by those of skill in the art that in some embodiments, the measured x value will reflect the amount of sulfur in the mixture. It will also be appreciated that the sodium salts in the anolyte comprise anions and that the methods also include oxidizing the anions at the anode. Where, e.g., the anolyte includes sodium sulfide and/or sodium polysulfides, the methods may include oxidizing the sulfide and polysulfide anions to higher polysulfides and/or sulfur, such that the anolyte may comprise sulfur. In any embodiments of the methods, the sulfur may be recovered from the anolyte by, e.g., phase separating the sulfur as a solid and/or immiscible liquid and removing or otherwise recovering it from the anolyte. The phase separation and recovery may be accomplished by standard means such as cooling and precipitation or crystallization of the sulfur, or cooling and settling the liquid sulfur so it may be drawn off from the rest of the anolyte.

In any embodiments herein, the amount of sodium in the anolyte may range from about 1 wt % to about 10 wt %, e.g., about 1 wt %, about 2 wt %, about 3 wt %, about 4 wt %, about 5 wt %, about 6 wt %, about 7 wt %, about 9 wt %, about 10 wt % or a range between and including any two of the foregoing values. For example, the amount of sodium in the anolyte may range from about 3 wt % to about 7 wt %.

In any embodiments herein, temperature-sensitive solvents of the present technology may include an alkyl diol, alkyl triol, cycloalkyl diol, and/or a cycloalkyl triol. For example, the temperature-sensitive solvent may be selected from the group consisting of ethylene glycol, propylene glycol, butane-1,4-diol, diethylene glycol, triethylene glycol, tetraethylene glycol, and glycerol. In any embodiments, the temperature sensitive solvent may include a lactam (e.g., N-methyl-2-pyrrolidone, (NMP)), a cyclic urea (e.g., N,N'-dimethylpropyleneurea, DMPU), a $C_{1-6}$ alkyl amide (e.g., formamide, N,N-dimethylformamide, acetamide), a carbonate (e.g., dimethyl carbonate, diethyl carbonate), ethers (e.g., dimethyl ether, dioxane) or mixtures of any of the foregoing with water. In any embodiments, the temperature sensitive solvent may include a mixture of two or more of the forgoing solvents (or classes of solvents). Thus, for example, the anolyte may include a mixture of two solvents in a weight ratio of 1:99 to 99:1, from 5:95 to 95:5 or, more typically, from 50:50 to 95:5, e.g., 50:50, 55:45, 60:40, 70:30, 80:20, 90:10. 95:5 or a range between and including any two of the foregoing ratios. In any embodiments, the While any compatible temperature sensitive solvent pairs may be used, examples include ethylene glycol and NMP, ethylene glycol and water, tetraethylene glycol and dimethyl ether, ethylene glycol and glycerol.

In any embodiments herein, the anolyte optionally includes one or more sodium salts as sodium ion conductivity enhancers. The presence of these sodium salts in the anolyte, along with sodium polysulfides increases the conductivity and the current density of the electrolytic flow cell. Sodium ion conductivity enhancers of the present technology include sodium salts selected to be substantially (preferably completely) soluble at the concentration used, ionizable, and thermally stable in the temperature-sensitive solvent at both the first and second temperatures used in the present methods. Non-limiting examples of sodium ion conductivity enhancers include sodium halides (e.g., NaCl, NaBr, and NaI), sodium hydroxide, sodium carbonate, sodium sulfur oxygenates ($Na_2SO_4$, $Na_2SO_3$, $Na_2S_2O_3$), sodium hydrosulfide (NaSH), and mixtures of any two or more thereof. In any embodiments the anolyte may include a sodium halide, sodium hydroxide or a mixture of any two or more thereof. In any embodiments, 0.01 wt % to 20 wt % sodium conductivity enhancers may be present in the anolyte. For example, the anolyte may include 0.01 wt %, 0.05 wt %, 0.1 wt %, 0.2 wt %, 0.5 wt %, 1 wt %, 2 wt %, 3 wt %, 4 wt %, 5 wt %, 6 wt %, 8 wt %, 10 wt %, 12 wt %, 15 wt %, 16 wt %, 18 wt %, and 20 wt % sodium ion conductivity enhancers or a range between and including any two of the foregoing values. Thus, for example, the anolyte may optionally include 0.1 wt % to 20 wt %, 1 wt % to 18 wt % or 5 wt % to 15 wt % sodium ion conductivity enhancers. Conductivity enhancements of at least 10%-100% may be obtained with anolyte that include such enhancers compared to the same anolyte without such enhancers present. In some embodiments, the enhancement is at least 10%, at least 20%, at least 40%, at least 60%, at least 80%, at least 100% or a range between and including any two of the foregoing values.

In the present technology, the molten sodium cathode comprises sodium and is optionally a sodium alloy. In any embodiments, the sodium of the molten sodium cathode may contain small amounts of adventitious impurities but may still be substantially pure (e.g., at least 99% sodium, at least 99.5% sodium, or at least 99.9% sodium). It will be understood by those skilled in the art that suitable sodium alloys are predominantly composed of sodium metal. In any embodiments, the sodium alloy is at least 80 wt % sodium metal, e.g., at least 80 wt %, at least 85 wt %, at least 90 wt %, at least 95 wt %, at least 96 wt %, at least 97 wt %, at least 98 wt %, at least 99 wt % or a range between and including any two of the foregoing values. For example, in any embodiments, the sodium alloy may be from 80 wt % to 99 wt % sodium metal. Alloys of the alkali metal may include, e.g., alloys with one or one or more of Si, Ge, Sn, Pb, Hg, Cs, Sb, Bi, Zn, Al, Ti, Co, Ni, Mn, and Cd. In any embodiments, the liquid alkali metal may be a sodium alloy that includes Cs. The amount of non-sodium metal in the alloy may make up, e.g., 1-20 wt % of the total sodium alloy by weight. Thus, the non-sodium metal may be 1 wt %, 2 wt %, 3 wt %, 4 wt %, 5 wt %, 6 wt %, 8 wt %, 10 wt %, 15 wt %, 20 wt %, or an amount between and including any two of the foregoing values.

In any embodiments of the methods and systems herein, wherein an anode current collector in electrical contact with the anode is disposed in the anolyte compartment of the electrochemical cell. In any such embodiments, the anode current collector may be or include one or more of nickel (e.g., foam or mesh), various carbon types (e.g., carbon foam, carbon felt), steel, Kovar, or cobalt. In any embodiments, the anode current collector may include nickel.

In any embodiments, the electrochemical flow cell may further include a cathode current collector. The cathode current collector may include nickel or other suitable materials known in the art.

In any embodiments, the ceramic sodium ion conductive membrane may be sodium super ionic conductor, a sodium ion conducting garnet-like ceramic, sodium β"-alumina, or sodium-conducting glass ceramic. For instance, where the negative electrode active material comprises sodium, the alkali-ion-conductive membrane may comprise any suitable type of NaSICON membrane, a sodium ion conducting garnet-like ceramic, a Na-β"-alumina or a sodium-ion-conductive glass ceramic membrane. NaSICON compositions may include but are not limited to $Na_3Zr_2Si_2PO_{12}$, $Na_{1+x}Si_xZr_2P_{3-x}O_{12}$ (where x=1.6 to 2.4), Yittrium-doped NaSICON (e.g., $Na_{1+x+y}Zr_{2-y}Y_ySi_xP_{3-x}O_{12}$, $Na_{1+x}Zr_{2-y}Y_ySi_xP_{3-x}O_{12-y}$, where x=1.6-2.4, y=0-0.25), $Na_{1+x}Zr_2X_y(PO_4)_3$ wherein x is from 0 to 3, y is 0-1.5 and X is a dopant (e.g., Fe, Al, Ti, Hf, Co, Ni, Nb), and Fe-doped NaSICON ($Na_3Zr_{2/3}Fe_{4/3}P_3O_{12}$). A non-limiting example of a Na-β"-alumina membrane is $Na_{(1.53-1.73)}Li_{(0.28-0.32)}Al_{(10.66-10.72)}O_{17}$. In any embodiments, the sodium ion conducting ceramic membrane may be a sodium ion conducting garnet-like ceramic with the general formula of $A_xB_2C_3O_{12}$, where A is the alkali metal ion with x=3-9, (B=$Te^{6+}$, $Ta^{5+}$, $Nb^{5+}$, $Zr^{4+}$; C=$La_{3+}$, $Y^{3+}$, $Nd^+$). Non-limiting examples of a Na-conducting ceramic glass include sodium phosphate, such as $xNa_2O.yP_2O_5$, sodium silicate, such as $xNa_2O.ySiO_2$, sodium borate, such as $xNa_2O.yB_2O_3$, sodium aluminate, such $xNa_2O.yAl_2O_3$, and mixtures of any two or more thereof; in any of the foregoing the molar ratio of x:y may range from 1:3 to 3:1, 1:2 to 3:1, 1:2 to 2:1, 1:2 to 1:1, 1:3 to 2:1, or 1:3 to 1:1.

In any embodiments, the ceramic sodium ion conductive membrane is a NaSiCON or Na-β"-alumina membrane. In any embodiments, the ceramic sodium ion conductive membrane may have a conductivity of at least 10 mS cm$^{-1}$ or at least 50 mS cm$^1$, e.g., a conductivity of 10 mS cm$^{-1}$ to 100 mS cm$^{-1}$. For example, the ceramic sodium ion conductive membrane may have a conductivity of 10 cm$^-$, 20 cm$^{-1}$, 30 cm$^{-1}$, 40 cm$^{-1}$, 50 mS cm$^{-1}$, 60 mS cm$^{-1}$, 70 mS cm$^{-1}$, 80 mS cm$^{-1}$, 90 mS cm$^{-1}$, 100 mS cm$^{-1}$, or a range between and including any two of the foregoing values.

As disclosed herein, the dual temperature methods of the present technology reduce or avoid degradation of temperature-sensitive solvents used as an electrolyte, e.g., an anolyte in an electrolytic flow cell to maintain high throughput and extend service life. Temperature control in the present methods may be carried out in several ways. In any embodiments, the anolyte may be heated to the first temperature shortly before or as the anolyte enters the anolyte compartment and may be cooled to the second temperature immediately upon exiting the anolyte compartment or shortly thereafter. In any embodiments, the ceramic sodium ion conductive membrane or the ceramic sodium ion conductive membrane and anolyte compartment are heated to the first temperature, for example, by a thermal enclosure surrounding the anolyte compartment or by heat exchanging elements within the anolyte compartment. The anolyte may thus be heated to the first temperature by the anolyte compartment or may also be heated in whole or in part prior to entering the heated anolyte compartment.

In any embodiments, the first temperature may range from about 115° C. to about 150° C., e.g., about 115° C., about 120° C., about 125° C., 130° C., 135° C., 140° C., 145° C., 150° C. or a range between and including any two of the foregoing values. In any embodiments, the first temperature may thus also range from about 120° C. to about 150° C., or about 125° C. to about 150° C. or about 145° C.

In any embodiments, the second temperature may range from about 80° C. to less than 115° C. e.g., about 80° C., about 85° C., about 90° C., about 95° C., about 110° C., less than 115° C., or a range between and including any two of the foregoing values. In any embodiments, the second temperature may thus also range from about 80° C. or about 85° C. to about 110° C.

In view of the guidance provided herein, it is within the skill in the art to select a first temperature to provide the desired conductivity and throughput, and to select a second temperature that limits degradation of the temperature-sensitive solvent in the anolyte to provide long service life at the desired throughput, yet minimizes energy consumption for heating/cooling of the anolyte. Thus, while in some embodiments, the second temperature will be selected to cause degradation of the temperature-sensitive solvent at a rate less than 20% of the rate that occurs at the first temperature, a second temperatures to limit degradation to other rates may be readily selected by one of ordinary skill in the art. Thus, in some embodiments the second temperature is selected to cause less than 25%, less than 20%, less than 15%, less than 10%, less than 5%, less than 4%, 3%, 2% or 1% of the rate of degradation that occurs at the first temperature. In any embodiments, the Thus, in any embodiments, the methods herein may include:
introducing an anolyte at a first temperature into an anolyte compartment of an electrochemical flow cell, wherein
the anolyte compartment comprises an anode comprising a sodium salt;
the anolyte comprises an effective amount of the sodium salt dissolved in a temperature-sensitive solvent;
the electrochemical flow cell further comprises a catholyte compartment and a ceramic sodium ion conductive membrane that separates the anolyte compartment from the catholyte compartment; and
the catholyte compartment comprises a molten sodium cathode;
causing sodium ions from the sodium salt to pass through the sodium ion conductive membrane from the anolyte compartment to the catholyte compartment;
reducing the sodium ions to sodium metal at the molten sodium cathode; and cooling the anolyte outside the anolyte compartment to a second temperature;
wherein,
the ceramic sodium ion conductive membrane has a conductivity of at least 50 mS cm$^{-1}$; and
the second temperature causes degradation of the temperature-sensitive solvent at a rate less than 20% of the rate that occurs at the first temperature;
the sodium salt is selected from the group consisting of a sodium sulfide, a sodium polysulfide, a combination of sodium sulfide and one or more sodium polysulfides, a sodium halide, a sodium polyhalide, and a combination of sodium halide and one or more sodicum polyhalides; and
the temperature-sensitive solvent comprises an alkyl diol and/or a cycloalkyl diol.

In some such embodiments, the sodium salt is selected from the group consisting of a sodium sulfide, a sodium polysulfide, or a combination of sodium sulfide and one or more sodium polysulfides The present methods may use a variety of electrochemical cell configurations. An illustrative embodiment of one such cell configuration is shown schematically in FIG. 1A. The cell 100 includes a molten sodium cathode 110 (which may be sodium or sodium alloy) disposed in a catholyte compartment 115. The cell also includes an anode 120 (i.e., a sodium salt(s)) disposed in an anolyte compartment, 125. A ceramic sodium ion conductive membrane 130 (e.g., NaSICON, Na-β"-alumina, a sodium ion conducting garnet-like ceramic, sodium-conducting glass ceramic,etc.) separates the catholyte and anolyte compartments and their contents. The membrane 130 may be secured to the cell housing with O-rings 140A and 140B. The cell may include cathode and anode current collectors 150A and 150B respectively, in electrical contact with the cathode and anode. During cell operation, the anolyte may be circulated into and out of the anolyte compartment. Not shown is an optional external chamber fluidly connected to the catholyte compartment where excess molten sodium may flow into during sodium metal regeneration. It will be understood that the electrochemical cells of the present technology may be configured with sensors, controllers, monitors, regulators, flow meters, access ports, and alert mechanisms to permit the concentration and ratio of constituents such as sodium, elemental sulfur, temperature-sensitive solvent, oxidation states, open cell voltage and the like to be monitored, measured, and maintained.

Figure 1B:
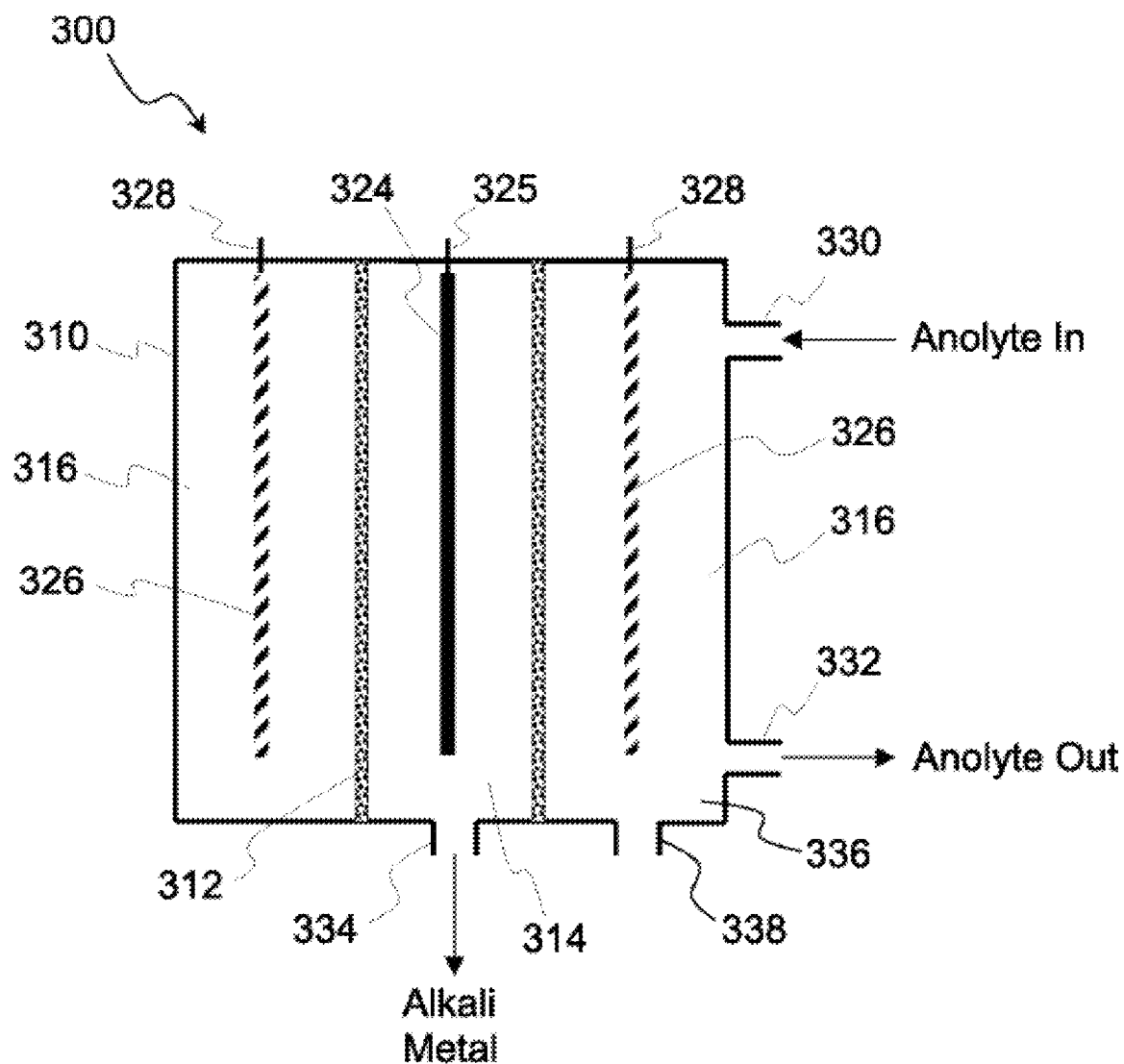

Alternatively, FIG. 1B shows a schematic sectional view of another illustrative embodiment of electrolytic cells of the present technology. The cell is comprised of a housing 310, which typically is an electrical insulator and which is chemically resistant to solvents and sodium sulfide. A ceramic sodium ion conductive membrane 312, in this case in the form of a tube, divides the catholyte compartment 314 from the anolyte compartment 316. Within the catholyte compartment is a cathode (molten sodium or sodium alloy) and cathode current collector. The cathode current collector 324 may be configured to penetrate the housing 310 or have a lead 325 that penetrates the housing 310 so that a connection may be made to negative pole of a DC electrical power supply (not shown). Within the anolyte compartment 316 is an anode collector 326 which in this case is shown as a porous mesh type electrode in a cylindrical form which encircles the membrane tube 312. A lead 328 penetrates the housing so that a connection may be made with a positive pole of the DC power supply. An anolyte solution flows through an anolyte inlet 330. The anolyte comprises the anode (i.e., sodium salt(s)), which is as described herein. As anolyte flows in through the inlet 330, anolyte also flows out of the outlet 332. In some cases a second liquid phase of molten sulfur may also exit with the anolyte. An optional second outlet may be provided from the anolyte compartment at a location lower than the anolyte outlet 332. The second, lower outlet may be used more for removal of molten sulfur that has settled and accumulated at the cell bottom. The space between the cathode 324 and the membrane 312 is generally filled with molten alkali metal. As the cell operates, alkali metal ions pass through the membrane 312 and reduce at the cathode 324 to form alkali metal in the catholyte compartment 314 resulting in a flow of alkali metal through the catholyte outlet 334.

A cell may have multiple anodes, anode current collectors, cathodes, cathode current collectors and membranes. Within a cell the anodes/collectors all would be in parallel and the cathodes/collectors all in parallel.

Referring to FIG. 1B, electrolytic cell housing 310 may be an electrically insulative material such as most polymers. The material also is preferably chemically resistant to solvents. Polytetrafluoroethylene (PTFE) is particularly suitable, as well as Kynar® polyvinylidene fluoride, or high density polyethylene (HDPE). The cell housing 310 may also be fabricated from a non-insulative material and non-chemically resistant materials, provided the interior of the housing 310 is lined with such an insulative and chemically resistant material. Other suitable materials would be inorganic materials such as alumina, silica, alumino-silicate and other insulative refractory or ceramic materials.

The ceramic sodium ion conductive membrane 312 preferably is substantially permeable only to sodium and substantially impermeable to anions, polyanions, and dissolved sulfur. The membrane 312 may be fabricated in part from an alkali metal ion conductive material. If the metal to be recovered by the cell is sodium, a useful material for the divider is NaSICON which has relatively high ionic conductivity. A typical NaSICON composition may be as disclosed herein. The membrane 312 may have a portion of its thickness which has negligible through porosity such that liquids in the anolyte compartment 316 and catholyte compartment 314 cannot pass from one compartment to the other but substantially only sodium ions can pass from the anolyte compartment 316 to the catholyte compartment 314. The membrane may also be comprised in part by an alkali metal (i.e., sodium) ion conductive glass-ceramic such as the materials produced by Ohara Glass of Japan.

The anode current collector 326 is located within the anolyte compartment 316. It may be fabricated from an electrically conductive material such as stainless steel, nickel, iron, iron alloys, nickel alloys, and other anode materials known in the art. The anode 326 is connected to the positive terminal of a direct current power supply. The anode 326 may be a mesh, foam, a monolithic structure or may be a monolith with features to allow passage of anolyte (comprising the sodium salt anode) through the anode structure. Anolyte solution is fed into the anolyte compartment through an inlet 330 and passes out of the compartment through and outlet 332. The electrolytic cell 300 can also be operated in a semi-continuous fashion where the anolyte compartment is fed and partially drained through the same passage.

The electronically conductive cathode current collector 324 may be in the form of a strip, band, rod, or mesh. The cathode current collector 324 may be comprised of most electronic conductors such as nickel, steel, iron, copper, or graphite. A portion of the cathode current collector may be disposed within the catholyte compartment 314 and a portion outside the catholyte compartment 314 and cell housing 310 for electrical contact. Alternatively, a lead 325 may extend from the cathode current collector outside the cell housing 310 for electrical contact. Within the catholyte compartment 314 is a bath of molten sodium.

One non-limiting example of the operation of the electrolytic cell 300 is described as follows: anolyte solution is fed into the anolyte compartment 316. The electrode current collectors 324, 326 are connected to a voltage source such that there is an electrical potential between the anode current collector 326 and the cathode current collector 324 that is greater than the $Na_2S_x$ dissociation voltage which ranges between about 1.8V and about 2.5V depending on the composition. For example, the disociation voltage may be 1.8, 1.9, 2.0, 2.1, 2.2, 2.3, 2.4, or 2.5V, or a range between and including any two of the foregoing values. Concurrently, sodium ions pass through the membrane 312 into the catholyte compartment 314, sodium ions are reduced to the metallic state within the catholyte compartment 314 with electrons supplied through the cathode current collector 324, and sulfide and polysulfide is oxidized at the anode current collector 326 such that lower polysulfide anions become higher polysulfide anions and/or elemental sulfur forms. While sulfur is formed it is dissolved into the anolyte solvent in whole or in part. On sulfur saturation or upon cooling, sulfur may form a second liquid phase of that settles to the bottom of the anolyte compartment 316 of the electrolytic cell. The sulfur may be removed with the anolyte solution to settle in a vessel outside of the cell or it may be directly removed from a settling zone 336 via an optional sulfur outlet 338, as shown. Alternative the cell 300 may be part of an electrochemical system that removes sulfur from the anolyte in other ways, and sulfur outlet 338 is absent.

Figure 1C:
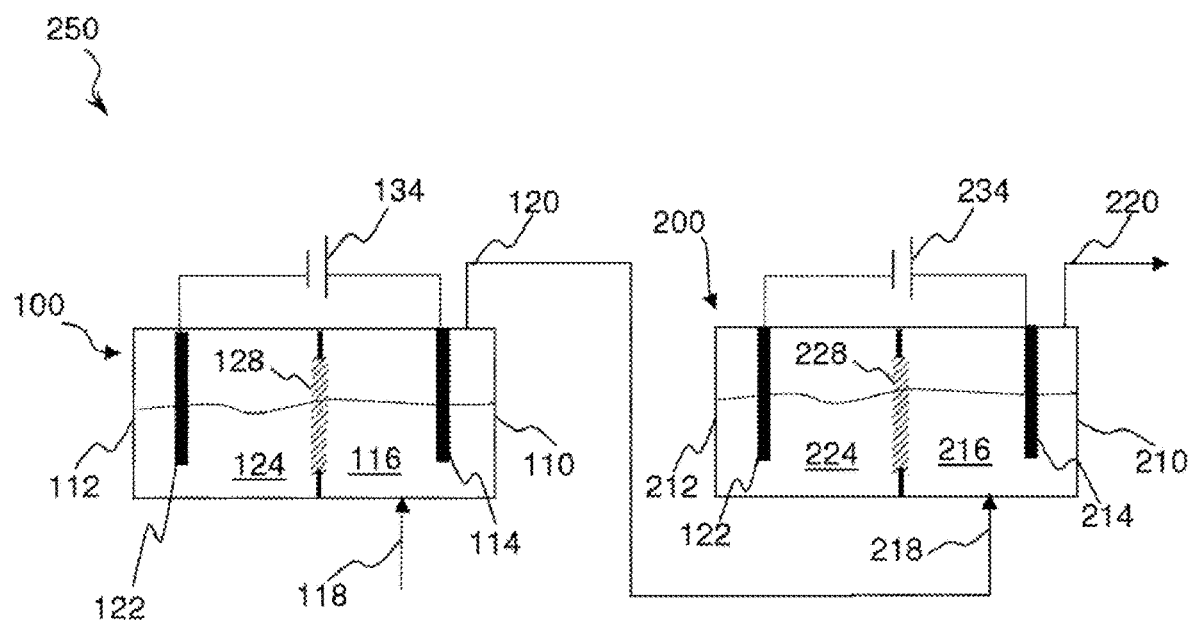
FIG. 1C shows an illustrative embodiment of serial electrochemical cells arranged to oxidize sodium sulfide to sodium polysulfides and eventually to elemental sulfur while also removing sodium metal from the anolyte.
Figure 2:
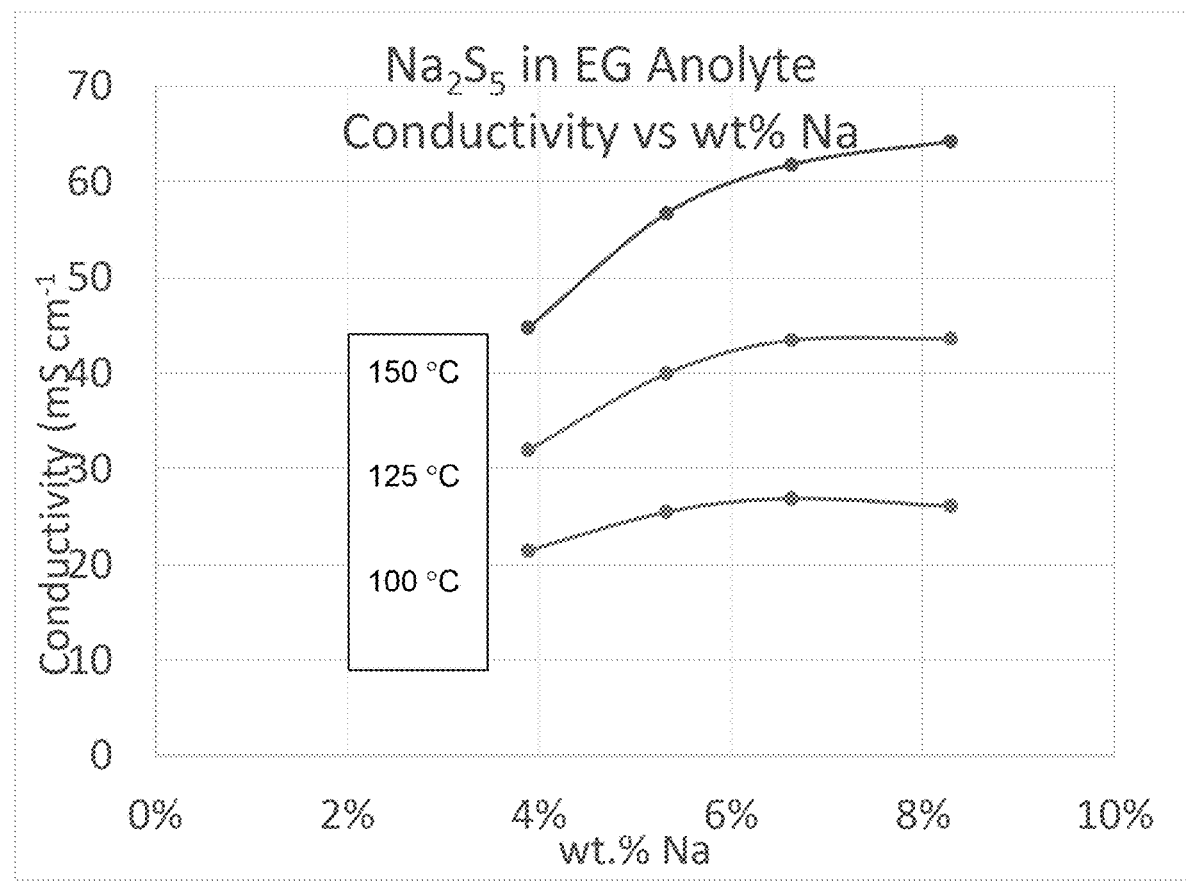
FIG. 2 is a graph showing conductivity of $Na_2S_5$ anolyte as a function of wt. % Na and temperature.

Cells of the present technology may be arranged in series. That is, the anolyte of one electrolytic cell may flow into a second cell where in each successive cell the ratio of sodium to sulfide decreases as the polysulfide forms become of higher order. Such an embodiment is shown in FIG. 1C.

Figure 8:
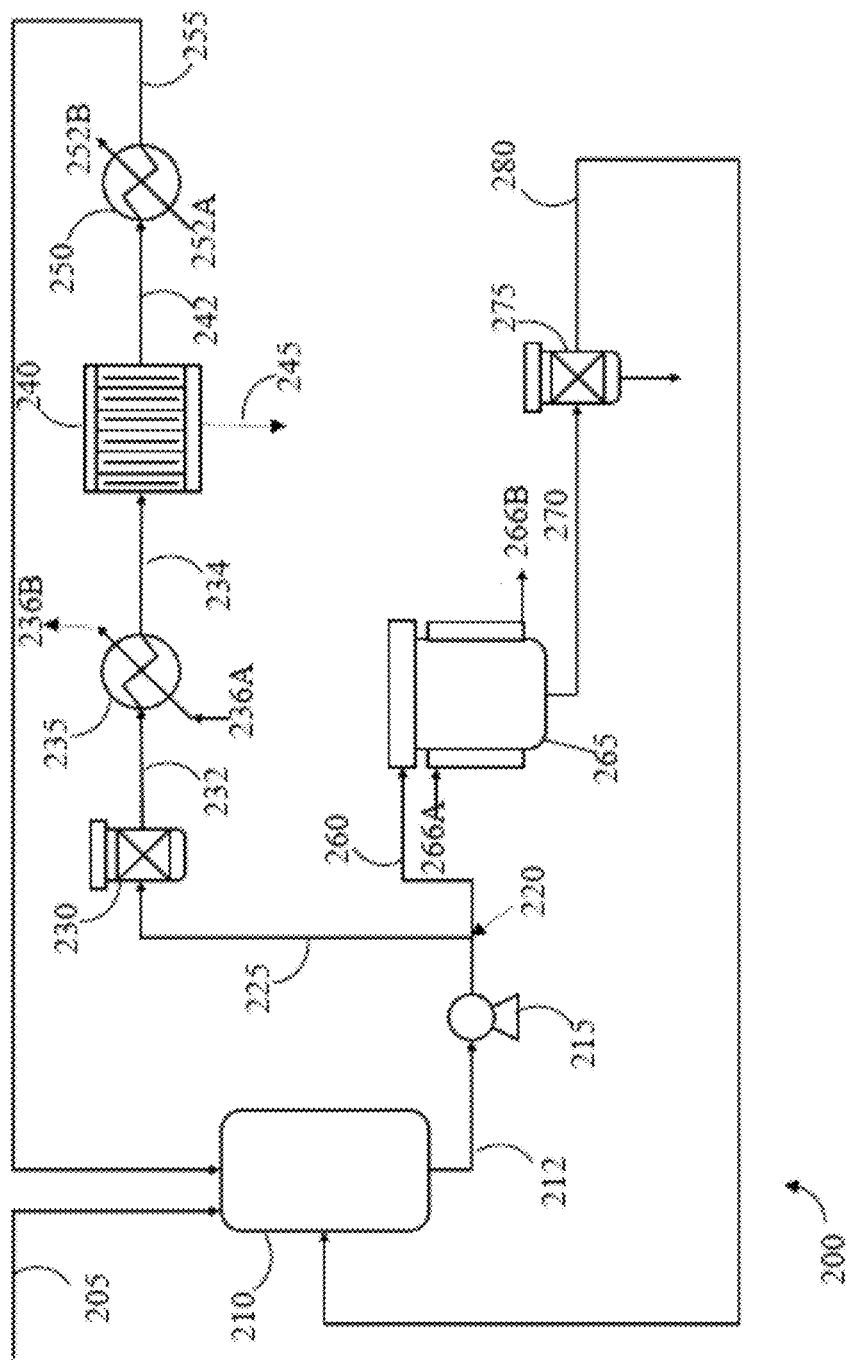
FIG. 8 shows a process flow diagram (PFD) for an illustrative embodiment of a system for carrying out the instant dual stage anolyte temperature electrolysis process.

The methods disclosed herein may be carried out in various types of electrochemical systems. As an illustrative embodiment only, the Process Flow Diagram (PFD) shown in FIG. 8 depicts one possible system 200 for carrying out the dual temperature anolyte process of the present technology. Solids 205 from the desulfurization process—including sodium sulfides, sodium-heavy metal salts, and other sodium-containing salts are added to the anolyte tank 210 which contains a temperature-sensitive anolyte solvent, e.g., an alkyl diol as described herein such as, but not limited to, ethylene glycol or propylene glycol. The anolyte 212 is pumped from anolyte tank 210 via fluid driver 215 (e.g., a pump) to a splitter 220, where a portion 225 is then led to an anolyte filter 230, which filters out any undissolved solids. The filtered anolyte 232 is then led to a heat exchanger 235, where it is heated to a temperature above 120° C. as described herein, e.g., a temperature of about 125° C. to about 150° C. Heating fluid is led into (236A) and out of (236B) of the heat exchanger to maintain the proper temperature. The heated anolyte 234 is led into an anolyte compartment of an electrochemical cell or series of cells 240 (e.g., see FIGS. 1A-1C), where sodium metal 245 is regenerated from the sodium salts and removed from the cell(s).

Upon exiting the electrochemical cells, the spent anolyte 242 is cooled in a second heat exchanger 250 to a temperature below 110° C. as described herein, e.g., to about 80 to about 100° C. The cooled anolyte 255, which may include some dissolved elemental sulfur, is recirculated to the anolyte tank 210.

At the splitter 220, a portion of the anolyte 260 exiting the anolyte tank is channeled to a crystallizer 265, where the anolyte is cooled to a temperature between about 15° C. and 80° C. by cooling fluid that circulates into (266A) and out of (266B) the crystallizer. Other suitable temperatures in this range may be used, including, e.g., 15° C. to 60° C., 30° C. to 80° C., or 40° C. to 80° C. Sulfur 277 precipitates out, including as crystals, which are then filtered out as the anolyte 270 passes through a sulfur filter 275. The lower temperatures in this part of the system and process not only lower the solubility of sulfur in the anolyte, leading to precipitation/crystallization of the sulfur (Ss), but destabilize $Na_2S_x$, encouraging $S_8$ formation and precipitation/crystallization. The desulfurized anolyte 280 is then recirculated back to the anolyte tank 210. It will be understood by those of skill in the art, that other methods of removing dissolved sulfur from the anolyte 260 could be employed such as gravimetric methods (e.g., centrifugation). Alternatively, different anolyte solvent systems with lower sulfur solubility could be used at a temperature above sulfur melting point, such that elemental sulfur could be removed as a liquid. Still other sulfur removal techniques such as extraction with a non-polar solvent, immiscible with the anolyte, could be used. It is within the skill in the art to modify the present system and process to use any suitable sulfur removal technique and to make other minor modifications such as, e.g. including additional fluid drivers (e.g., pumps), filters, heat exchangers and the like as needed, and to arrange such components to meet the need at hand.

EXAMPLES

Materials. Ethylene Glycol was obtained from Univar.

Example 1

Figure 9:
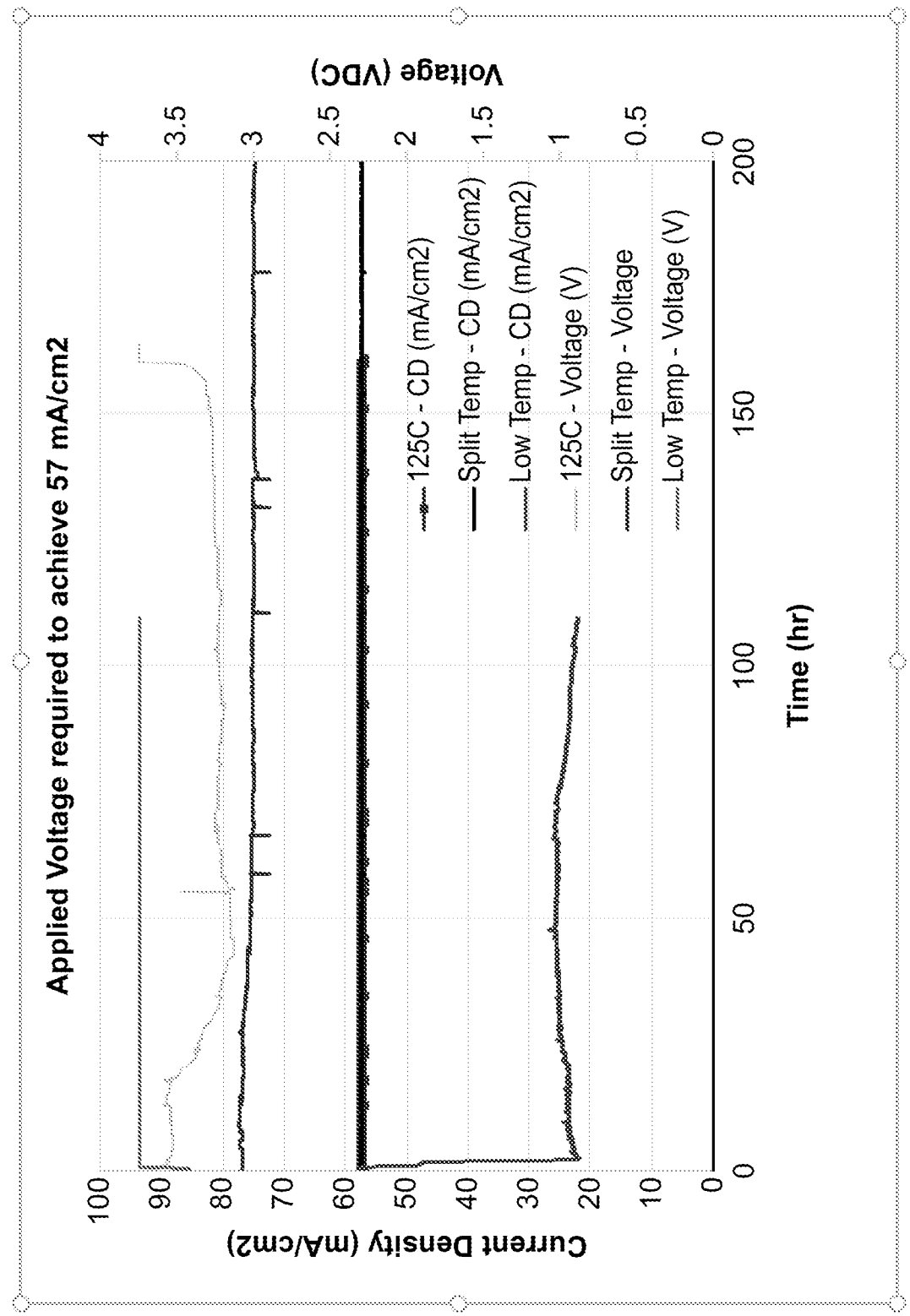
FIG. 9 shows the applied voltage (right y-axis) required to achieve 57 $mA/cm^2$ over time using an illustrative embodiment of an electrochemical cell and dual temperature electrolytic method of the present technology.
Figure 10:
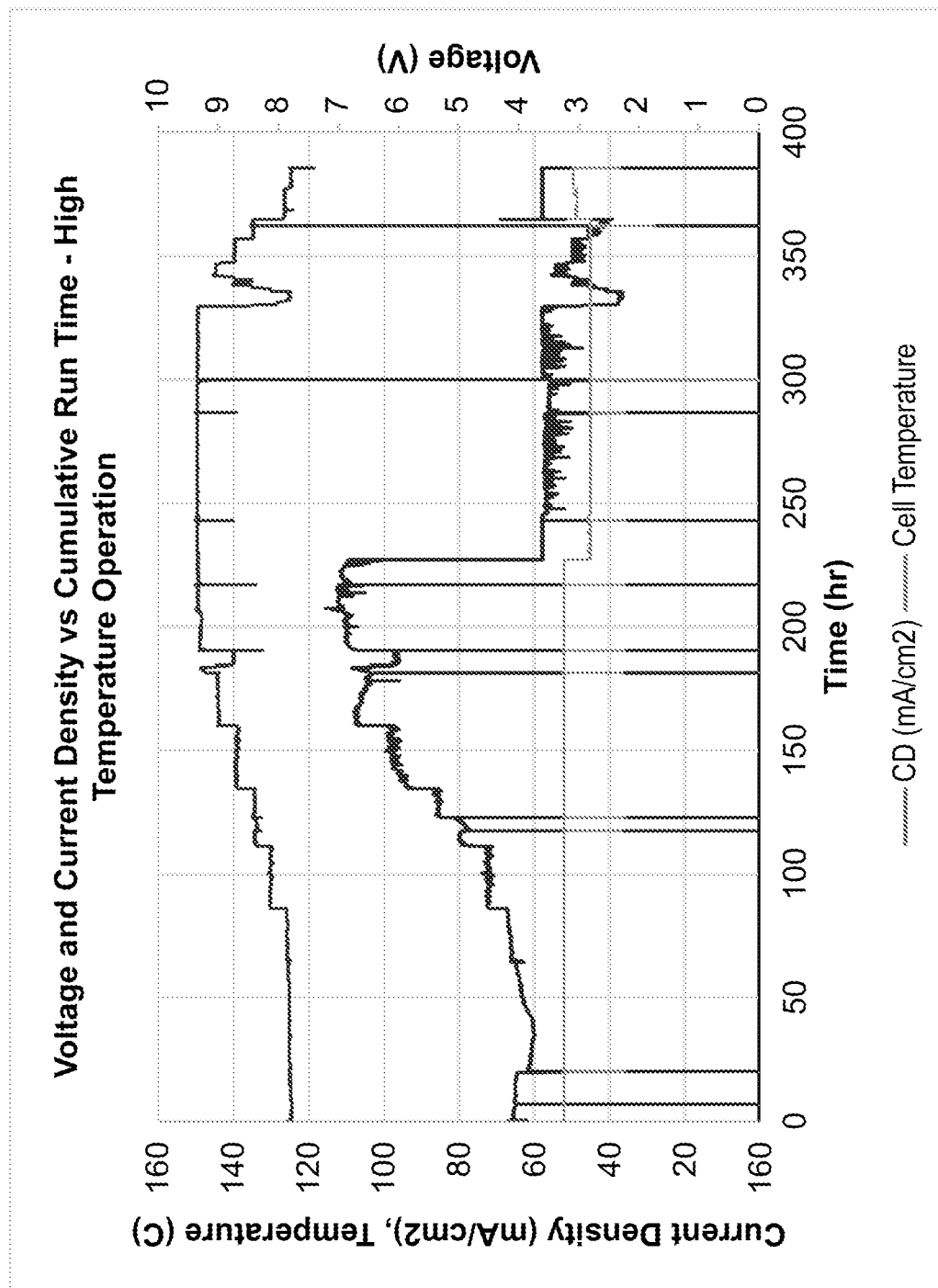
FIG. 10 shows voltage and current density over time for high temperature operation (125-150° C.) of an illustrative embodiment of the present technology as discussed in Example 1.

Electrochemical Cell With NaSICON Ceramic Membrane for Producing Sodium Metal from Sodium Polysulfides A hybrid electrochemical flow cell was constructed for use in the disclosed methods. The flow cell has an anolyte compartment, a catholyte compartment, and a 4.5 mm thick NaSICON ceramic membrane, separating the anolyte and catholyte compartments. The anolyte compartment includes a nickel anode current collector disposed therein, as well as an anolyte inlet and an anolyte outlet. The catholyte compartment includes a molten sodium cathode and a nickel cathode current collector. A power supply (Ametek Sorensen XHR Series Programmable: 7.5V, 130 A) was electrically connected to the current collector in each compartment. During operation of the cell, anolyte including ethylene glycol in which $Na_2S$ and sulfur were dissolved, flowed into the anolyte compartment through the inlet. The anolyte entered the anolyte compartment at a temperature of between 115° C. (or 125° C.) and 150° C., having been heated to this temperature shortly before entering the cell (e.g., in a heat exchanger as shown in FIG. 8). The sulfides/polysulfides are partially or completely oxidized, forming higher polysulfides and elemental sulfur, which at least partially dissolve in the ethylene glycol of the anolyte. Sodium ions from the oxidized sulfide/polysulfides are transported across the NaSICON membrane to the catholyte compartment in which a molten sodium cathode and a nickel current collector are disposed. The sodium ions are reduced to sodium metal at the cathode, and excess sodium flows through the catholyte compartment outlet. The "spent" anolyte, containing higher polysulfides and elemental sulfur flows out of the compartment through the anolyte outlet. A portion of the anolyte is sent to a crystallizer where it is cooled further to precipitate/crystallize elemental sulfur, which is filtered from the anolyte, which is then returned to the storage tank. A portion of the spent anolyte is returned to a storage tank where additional sodium sulfide/polysulfides are dissolved into the anolyte, which is then circulated again to the electrochemical cell to produce more sodium, higher polysufides and elemental sulfur. FIG. 9 shows the applied voltage required to achieve 57 mA/cm² over time for this cell in the dual temperature system of the present technology operated at low temperature (110° C.), dual temperatures(100° C. & 125° C.), and 125° C. FIG. 10 shows the applied voltage and current density for a cell inlet temperature of 125° C. to 150° C. After over 350 hours of exposure to elevated temperatures (>125° C.), the cell performance returned to the baseline conditions of 57 mA/cm² and 3.08V, demonstrating that the dual temperature system prevents anolyte degradation throughout the entire temperature range.

Example 2

XRD Analysis of Spent Anolyte

The electrochemical cell of Example 1 was operated at an anolyte temperature of about 130° C. Spent anolyte was collected, the ethylene glycol vacuum distilled and the remaining solids dried and examined by X-ray powder diffraction (XRD). Sodium sulfur oxygenates (such as sodium thiosulfate, sodium sulfate, etc.) were identified as due to extraction of oxygen in the glycol by $Na_2S_x$. Further, sodium carboxylates (such as sodium acetate, sodium glycolate, sodium formate, sodium oxalate etc.) were identified as being due to electrochemical oxidation of EG in alkaline medium.

Example 3

Effect of Temperature on Anolyte Containing $Na_2S_5$

Figure 3:
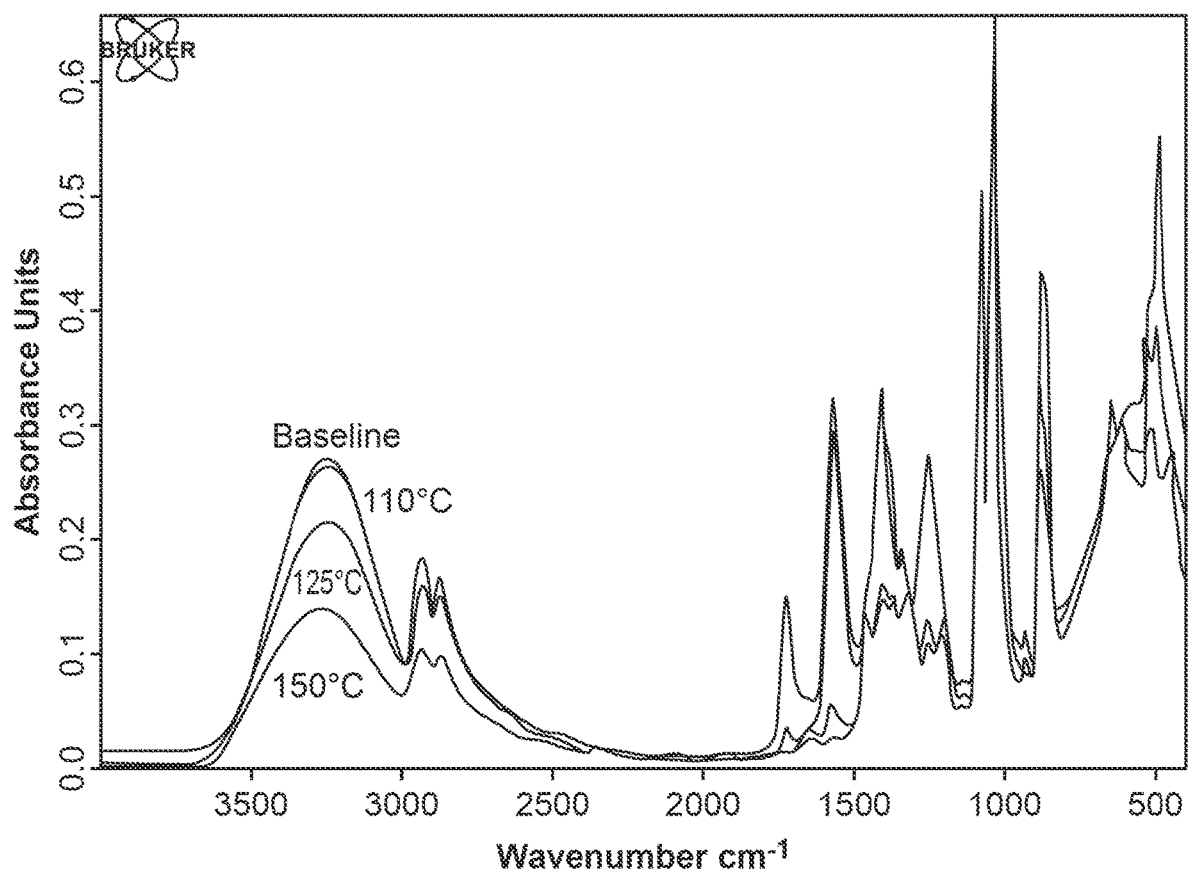
FIG. 3 shows FT-IR spectra of $Na_2S_5$ with 7% sodium dissolved in EG and incubated for 195 hours at different temperatures.

The effects of temperature on an anolyte comprising a model polysulfide, $Na_2S_5$ in a model anolyte solvent, ethylene glycol, were investigated by FT-IR using a Bruker Tensor 37. $Na_2S_5$ was prepared by mixing 1:4 molar ratio mixture of $Na_2S$ and $S_8$ in EG until it is dissolved to nominally provide $Na_2S_5$. FIG. 3 shows the FT-IR spectra of $Na_2S_5$ at 7 wt % sodium dissolved in EG and incubated for 195 hours at 110° C., 125° C., and 150° C. compared to baseline (i.e., prepared without any thermal incubation). The data shows minor shifts in peak heights for 110° C. data but major ones at 125° C., and 150° C. including appearance of new peaks indicative of new compound formation.

Figure 4:
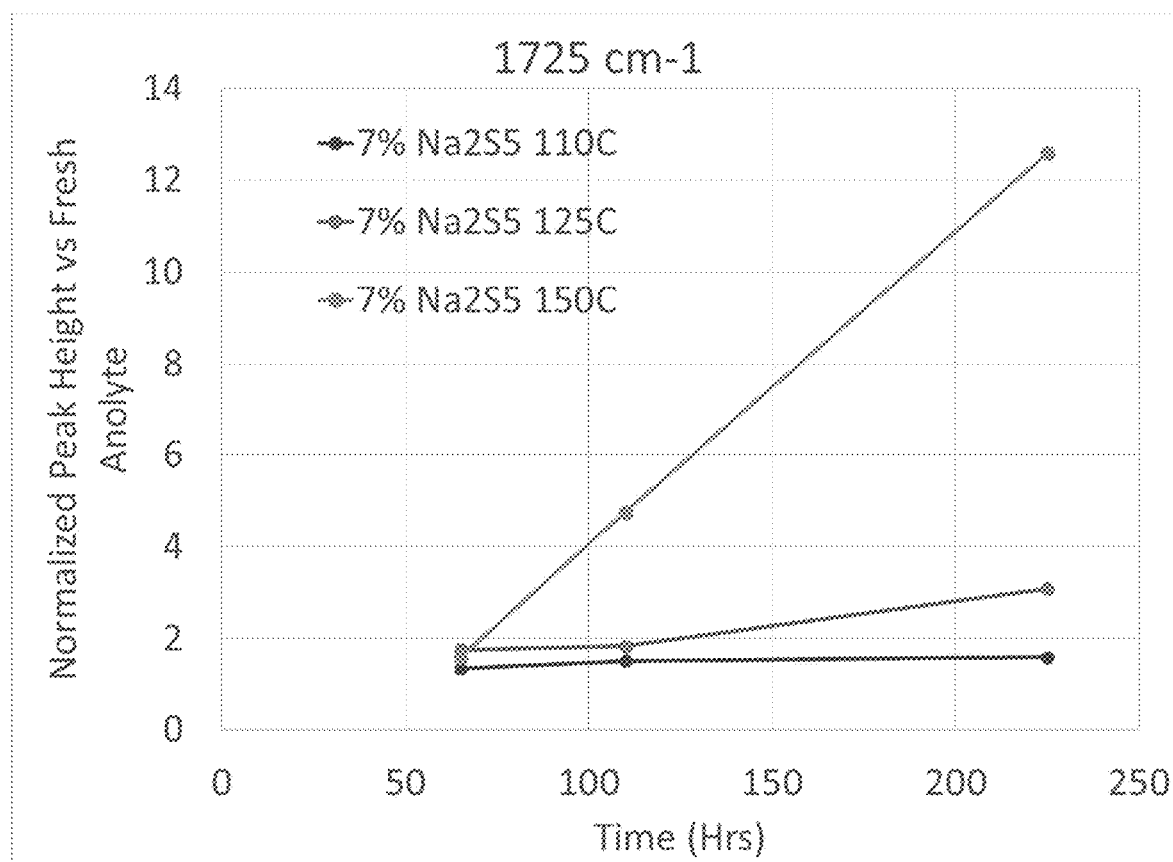
FIG. 4 shows normalized FT-IR peak heights vs. baseline for the peak at 1725 $cm^{-1}$ wavenumber, a characteristic feature of 2-hydroxyethyl acetate.
Figure 5:
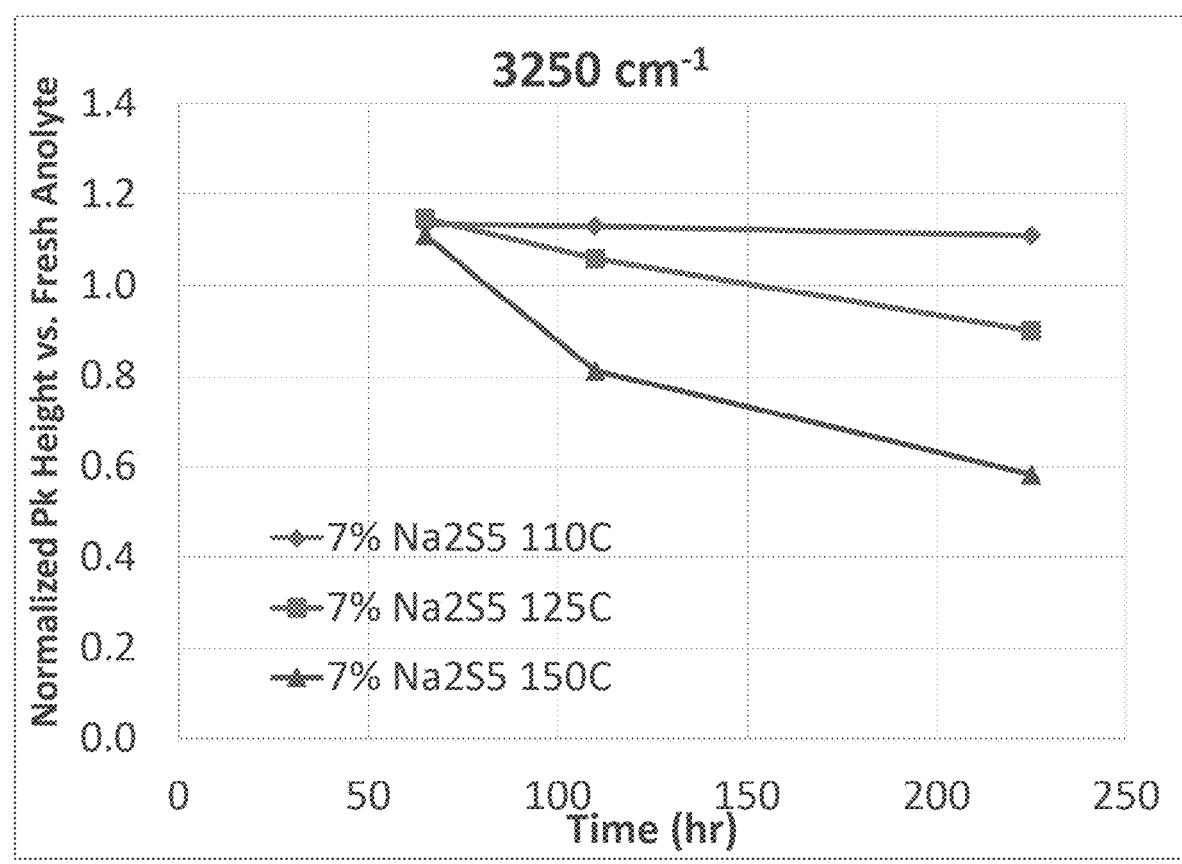
FIG. 5 shows normalized FT-IR peak heights vs. baseline for the peak at 3250 $cm^{-1}$ wavenumber, which is the O—H stretch from ethylene glycol.
Figure 6:
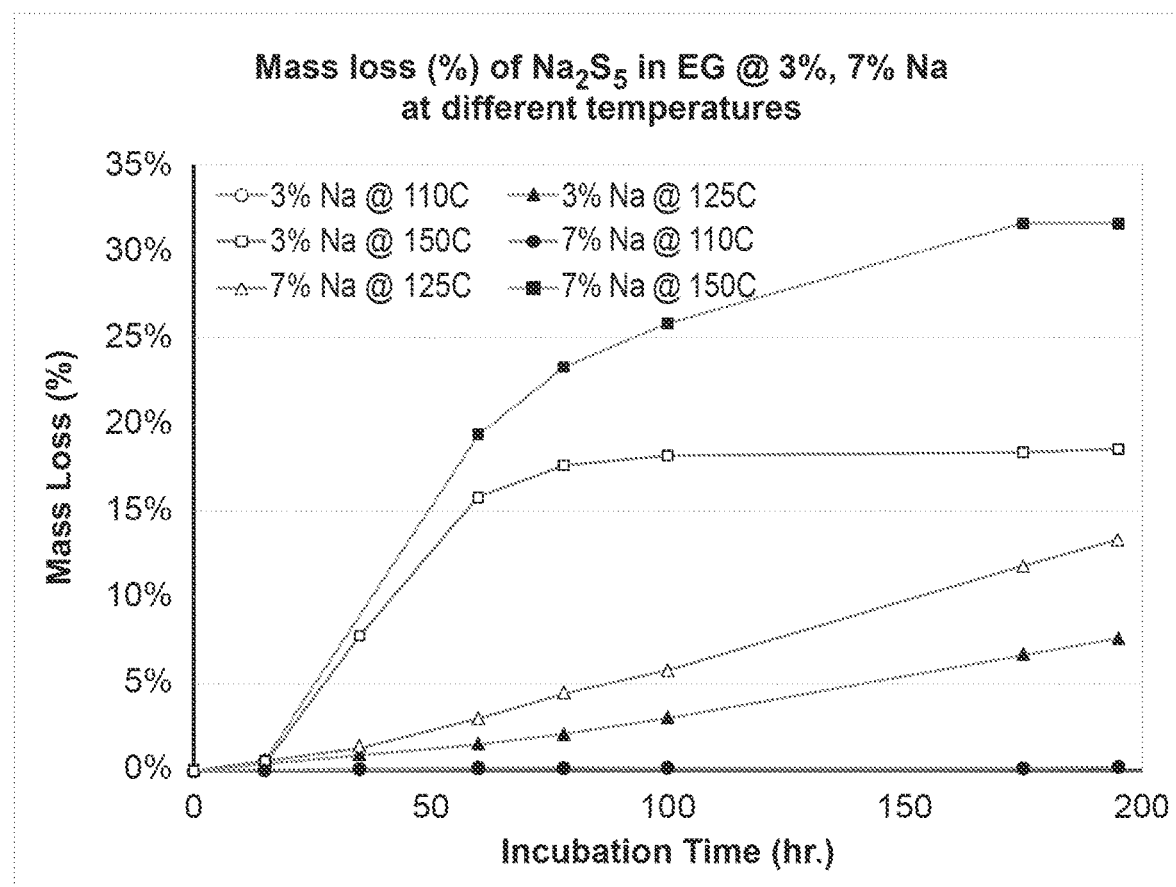
FIG. 6 is a graph showing observed mass losses of $Na_2S_5$ anolyte at 3% and 7% sodium at 110° C., 125° C. and 150° C. during thermal incubation.

In FIGS. 4 and 5, the changes in peak heights vs. baseline (i.e., normalized) in the FT-IR spectra at 1725 cm⁻¹, and 3250 cm⁻¹ wavenumbers are plotted. The absorption band at about 1725 cm⁻¹ is associated with 2-hydroxyethyl acetate, a side product, and the absorption band at 3250 cm⁻¹ is associated with EG. The data shows that during the first 65 hours of incubation, the anolyte is similarly affected at the three tested temperatures, 110° C., 125° C., and 150° C. However, further incubation showed no further deterioration at 110° C., whereas further deterioration was observed at 125° C. and 150° C. Specifically, the increase in the absorption at 1725 cm$^{-1}$ with increasing temperature indicates increased side-reactions producing 2-hydroxyethyl acetate. The decrease in the absorption at 3250 cm$^{-1}$ with increasing temperature indicates the disappearance of EG with increasing temperature as it is presumably converted to side products such as 2-hydroxyethyl acetate. FIG. 6 shows the mass loss as a percentage of the baseline amount after 195 hours for two groups of anolytes with 3 wt % and 7 wt % sodium content at the three temperatures. The data shows minimal mass loss at 110° C. compared to 125° C., and 150° C.

Figure 7:
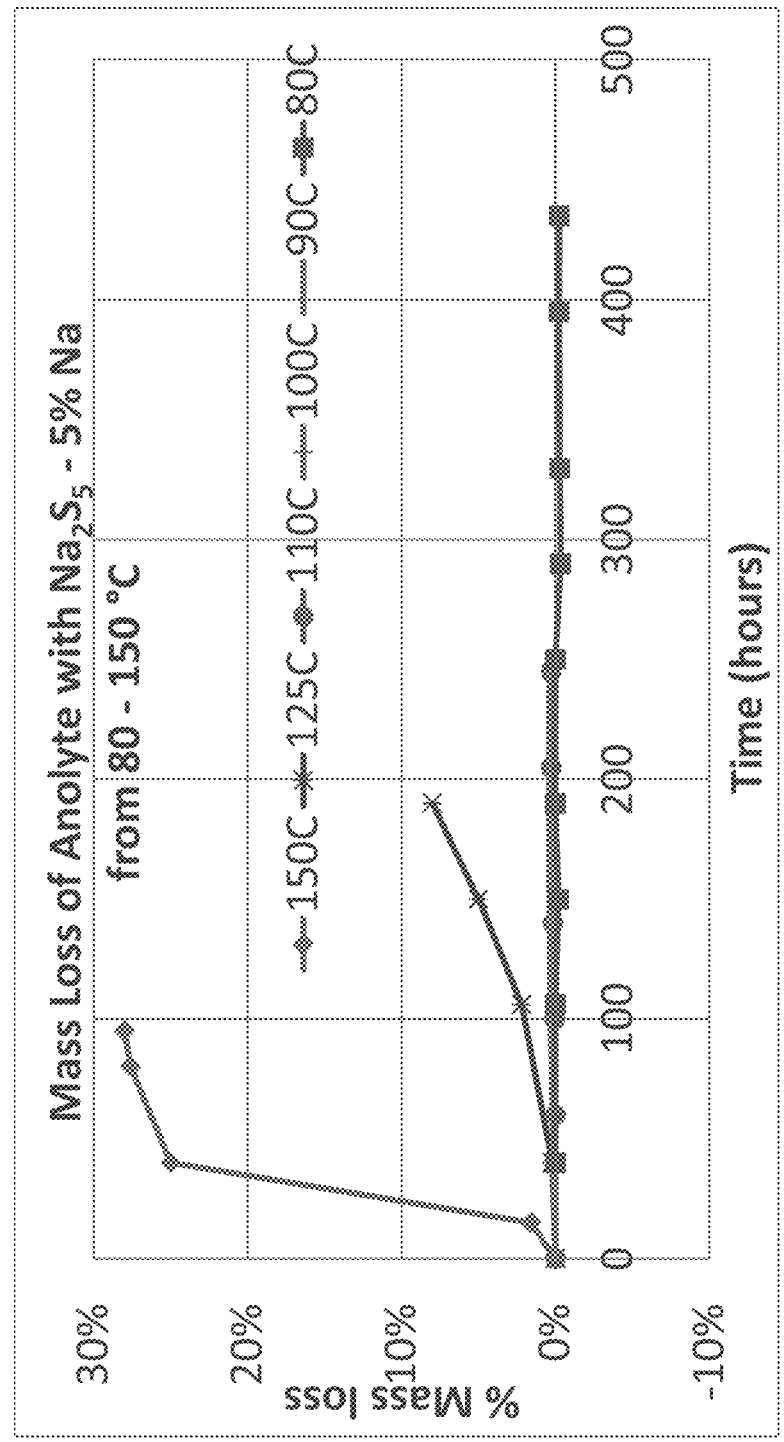
FIG. 7 is a graph showing observed mass loss of anolyte with $Na_2S_5$ in ethylene glycol anolyte at 5 wt % at temperatures ranging from 80° C. to 150° C.

In a separate test, $Na_2S_5$ anolyte in EG at 5 wt % sodium was prepared and incubated at various temperatures between 80° C. to 150° C. The results are shown in FIG. 7 as a plot of % mass loss vs. incubation time. The data shows a similar trend to the 7% and 3% Na samples, with samples at 110° C. and below showing negligible weight loss.

Figure 11:
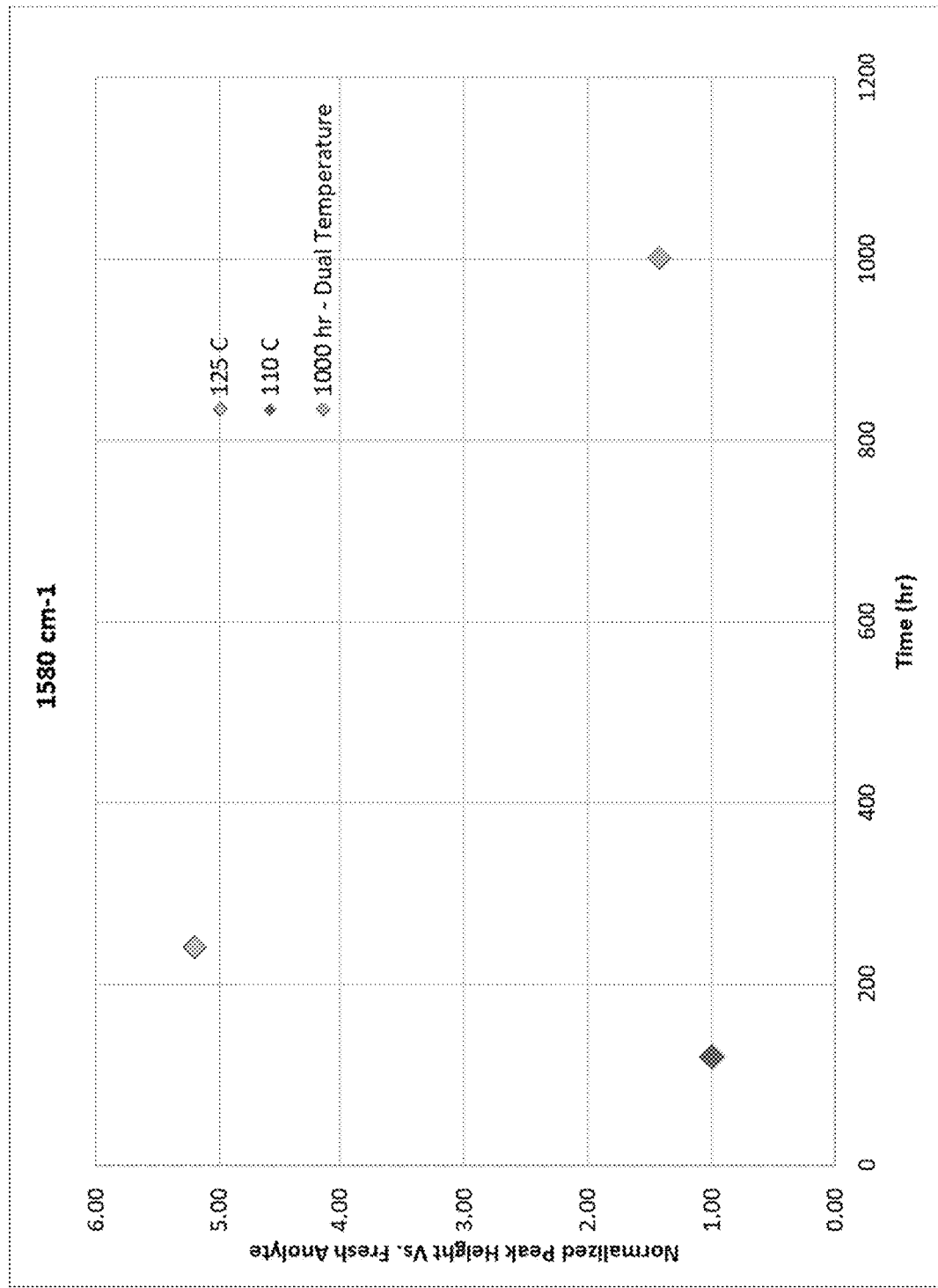
FIG. 11 shows normalized FT-IR peak heights vs. baseline for the peak at 1580 $cm^{-1}$ wavenumber.
Figure 12:
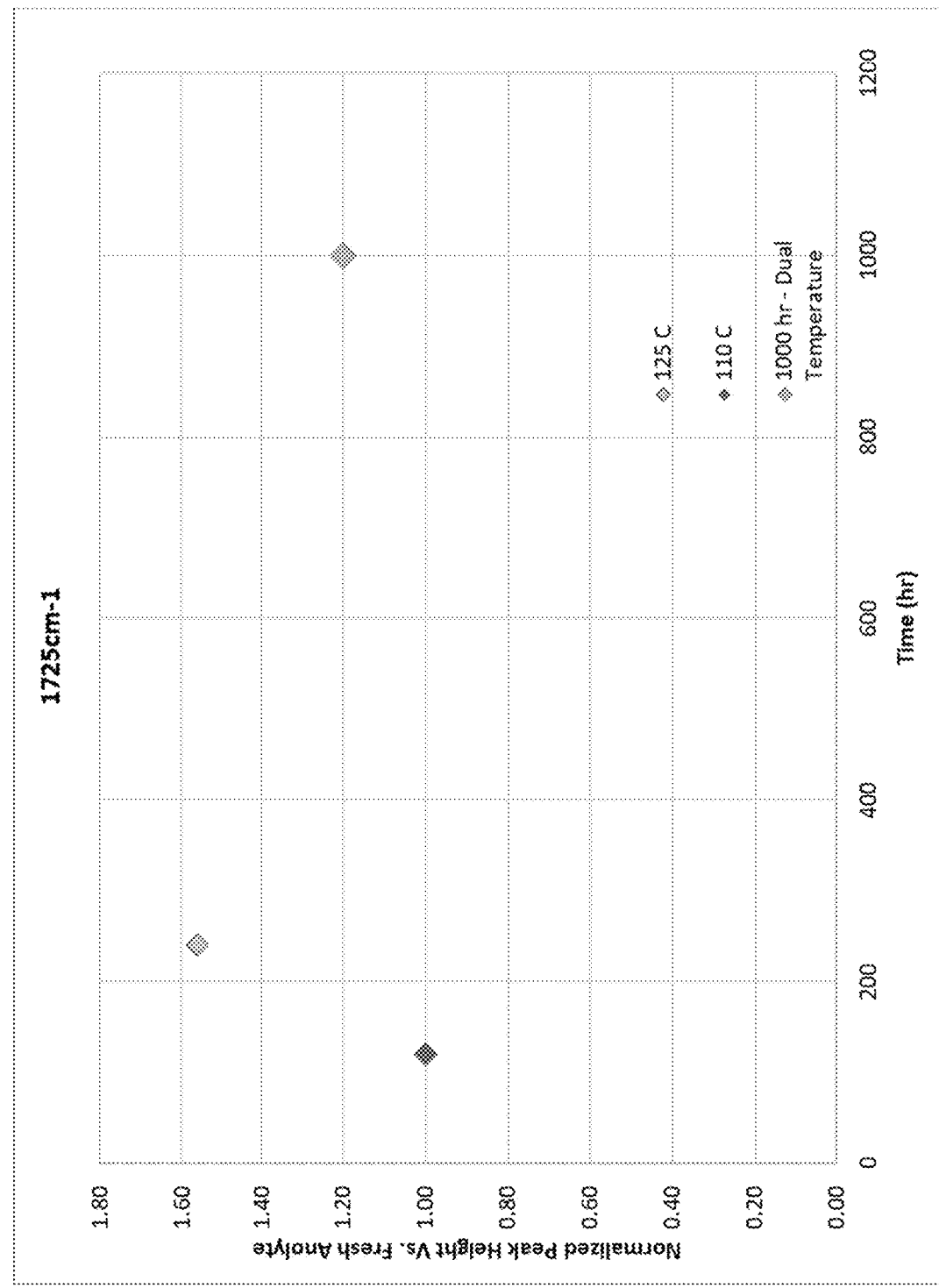
FIG. 12 shows normalized FT-IR peak heights vs. baseline for the peak at 1725 $cm^{-1}$ wavenumber.

The anolytes from cells (in Example 1) operated at low temperature (110° C.), dual temperatures (100° C. & 125° C.), and 125° C. (as shown in FIG. 9) were analyzed by FT-IR. The results for the three samples are shown in FIGS. 11 and 12 as normalized peak height at, respectively, 1580 cm$^{-1}$ and 1725 cm$^{-1}$, demonstrating the presence of breakdown products in the anolyte. The data show that at a constant temperature (no temperature swing test) of 125° C. showed much greater deterioration compared to 110° C. and dual temperature tests.

Example 4

Electrochemical Cell With β"-Alumina Ceramic Membrane for Producing Sodium Metal from Sodium Polysulfides A hybrid electrochemical flow cell is constructed as in Example 1 using a β"-alumina ceramic membrane of same thickness as the NaSICON ceramic membrane, to separate the anolyte and catholyte compartments. Due to the lower conductivity of the β"-alumina membrane, the cell is operated at about one third of the current density of corresponding cell using NaSICON in Example 1.

Alternatively, a hybrid electrochemical flow cell is constructed as in Example 1 using a β"-alumina membrane having about one quarter to one half the thickness as the NaSICON ceramic membrane, to separate the anolyte and catholyte compartments. The current density of this electrochemical flow cell is expected to be comparable to that of the corresponding cell using NaSICON in Example 1.

Example 5

Electrochemical Cell With NaSICON Ceramic Membrane and Mixture of Temperature-Sensitive Solvents for Producing Sodium Metal from Sodium Polysulfides A hybrid electrochemical flow cell is constructed as in Example 1 using a different temperature-sensitive solvent in the anolyte. In this cell, an 80:20 w/w mixture of ethylene glycol and NMP is used as the temperature-sensitive solvent. The cell is operated under the same conditions as in Example 1. The addition of NMP to ethylene glycol is expected to increase the sodium ion conductivity of the anolyte.

EQUIVALENTS

While certain embodiments have been illustrated and described, a person with ordinary skill in the art, after reading the foregoing specification, can effect changes, substitutions of equivalents and other types of alterations to the present methods, electrolytic cells, electrolytes, electrodes, systems, operating conditions, as set forth herein. Each aspect and embodiment described above can also have included or incorporated therewith such variations or aspects as disclosed in regard to any or all of the other aspects and embodiments.

The present technology is also not to be limited in terms of the particular aspects described herein, which are intended as single illustrations of individual aspects of the present technology. Many modifications and variations of this present technology can be made without departing from its spirit and scope, as will be apparent to those skilled in the art. Functionally equivalent methods within the scope of the present technology, in addition to those enumerated herein, will be apparent to those skilled in the art from the foregoing descriptions. Such modifications and variations are intended to fall within the scope of the appended claims. It is to be understood that this present technology is not limited to particular methods, solvents, electrolytes reagents, compounds, compositions, cells and conditions, which can, of course, vary. All methods described herein can be performed in any suitable order unless otherwise indicated herein or otherwise clearly contradicted by context. It is also to be understood that the terminology used herein is for the purpose of describing particular aspects only, and is not intended to be limiting. Thus, it is intended that the specification be considered as exemplary only with the breadth, scope and spirit of the present technology indicated only by the appended claims, definitions therein and any equivalents thereof. No language in the specification should be construed as indicating any non-claimed element as essential.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology (e.g., conductivity or current density of a claimed embodiment). The phrase "consisting of" excludes any element not specified. Moreover, use of any of the foregoing terms in the description with respect to a particular element or embodiment also contemplates the use of any of the other terms. For example, use of "comprise" with respect to one element or embodiment will also be understood to disclose use of "consisting essentially of" or "consists of" in respect of the same element or embodiment and vice versa.

In addition, where features or aspects of the disclosure are described in terms of Markush groups, those skilled in the art will recognize that the disclosure is also thereby described in terms of any individual member or subgroup of members of the Markush group. Each of the narrower species and subgeneric groupings falling within the generic disclosure also form part of the technology. This includes the generic description of the technology with a proviso or negative limitation removing any subject matter from the genus, regardless of whether or not the excised material is specifically recited herein.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member, and each separate value is incorporated into the specification as if it were individually recited herein.

All publications, patent applications, issued patents, and other documents (for example, journals, articles and/or textbooks) referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims, along with the full scope of equivalents to which such claims are entitled.

What is claimed is:

1. A method comprising:
   introducing an anolyte at a first temperature into an anolyte compartment of an electrochemical flow cell, wherein
   the anolyte comprises sulfur and an effective amount of a sodium salt dissolved in a temperature-sensitive solvent;
   the anolyte compartment comprises an anode, wherein the anode comprises the sodium salt;
   the electrochemical flow cell further comprises a catholyte compartment and a ceramic sodium ion conductive membrane that separates the anolyte compartment from the catholyte compartment; and
   the catholyte compartment comprises a molten sodium cathode;
   causing sodium ions from the sodium salt to pass through the ceramic sodium ion conductive membrane from the anolyte compartment to the catholyte compartment;
   reducing the sodium ions to sodium metal at the molten sodium cathode; and
   cooling the anolyte outside the anolyte compartment to a second temperature without recovery of sulfur;
   wherein the second temperature causes degradation of the temperature-sensitive solvent at a rate less than 20% of the rate that occurs at the first temperature.

2. The method of claim 1, wherein the sodium salt comprises a sodium sulfide, a sodium polysulfide, a mixture of sodium sulfide and one or more sodium polysulfides.

3. The method of claim 2, wherein the polysulfide has the formula Na2Sx wherein x is an integer from 1 to 32.

4. The method of claim 1, wherein the amount of sodium in the anolyte ranges from about 1 wt % to about 10 wt %.

5. The method of claim 1, wherein the amount of sodium in the anolyte ranges from about 3 wt % to about 7 wt %.

6. The method of claim 1, further comprising recovering the sulfur from the anolyte at a temperature from between about 15° C. and 80° C.

7. The method of claim 1, wherein the temperature-sensitive solvent is selected from the group consisting of an alkyl diol, alkyl triol, cycloalkyl diol, cycloalkyl triol, lactam, cyclic urea, C1-6 alkyl amide, carbonate, ether, mixtures of any two or more thereof, or mixtures of any of the foregoing with water.

8. The method of claim 1, wherein the temperature-sensitive solvent is selected from the group consisting of ethylene glycol, propylene glycol, butane-1,4-diol, diethylene glycol, triethylene glycol, tetraethylene glycol, glycerol and mixtures of two or more thereof.

9. The method of claim 1, wherein the temperature-sensitive solvent is ethylene glycol.

10. The method of claim 1, wherein an anode current collector in electrical contact with the anode is disposed in the anolyte compartment of the electrochemical cell.

11. The method of claim 10, wherein the anode current collector comprises one or more of nickel, various carbon types, steel, Kovar, or cobalt.

12. The method of claim 11, wherein the anode current collector comprises nickel.

13. The method of claim 1, wherein the electrochemical flow cell further comprises a cathode current collector.

14. The method of claim 13, wherein the cathode current collector comprises nickel.

15. The method of claim 1, wherein the ceramic sodium ion conductive membrane comprises a sodium ion conducting garnet-like ceramic, Na-conducting ceramic glass, NaSiCON or Na-β"-alumina.

16. The method of claim 1, wherein the first temperature ranges from about 115° C. to about 150° C.

17. The method of claim 1, wherein the second temperature ranges from 80° C. to less than 115° C.

18. The method of claim 1, wherein the ceramic sodium ion conductive membrane or the ceramic sodium ion conductive membrane and anolyte compartment are heated to the first temperature.

19. The method of claim 1, wherein the ceramic sodium ion conductive membrane or the ceramic sodium ion conductive membrane and anolyte compartment are heated to the first temperature by a thermal enclosure.

20. The method of claim 1, wherein the ceramic sodium ion conductive membrane has a conductivity of at least 10 mS cm-1 when anolyte is in the anolyte compartment.

21. The method of claim 1, wherein the ceramic sodium ion conductive membrane has a conductivity of at least 50 mS cm-1 when anolyte is in the anolyte compartment.

22. The method of claim 1, wherein the ceramic sodium ion conductive membrane has a conductivity of 10 mS cm-1 to 100 mS cm-1.

23. A method comprising:
   introducing an anolyte at a first temperature of 115° C. to about 150° C. into an anolyte compartment of an electrochemical flow cell, wherein the anolyte comprises an effective amount of a sulfur-containing sodium salt dissolved in a temperature-sensitive solvent comprising alkyl diol;

the anolyte compartment comprises an anode, wherein the anode comprises the sulfur-containing sodium salt;

the electrochemical flow cell further comprises a catholyte compartment and a ceramic sodium ion conductive membrane that separates the anolyte compartment from the catholyte compartment; and the catholyte compartment comprises a molten sodium cathode;

causing sodium ions from the sodium salt to pass through the ceramic sodium ion conductive membrane from the anolyte compartment to the catholyte compartment;

reducing the sodium ions to sodium metal at the molten sodium cathode; and cooling the anolyte outside the anolyte compartment to a second temperature of 80° C. to less than 115° C., without recovery of sulfur;

wherein the second temperature causes degradation of the temperature-sensitive, solvent at a rate less than 20% of the rate that occurs at the first temperature.

* * * * *